US011012473B1

(12) United States Patent
Ippatapu et al.

(10) Patent No.: US 11,012,473 B1
(45) Date of Patent: May 18, 2021

(54) SECURITY MODULE FOR AUTO-GENERATING SECURE CHANNELS

(71) Applicant: EMC IP HOLDING COMPANY LLC, Hopkinton, MA (US)

(72) Inventors: Venkata L. R. Ippatapu, Westborough, MA (US); Kenneth Dorman, West Brookfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 105 days.

(21) Appl. No.: 16/671,211

(22) Filed: Nov. 1, 2019

(51) Int. Cl.
*G06F 15/16* (2006.01)
*H04L 29/06* (2006.01)
*H04L 29/08* (2006.01)

(52) U.S. Cl.
CPC .......... *H04L 63/20* (2013.01); *H04L 67/1097* (2013.01); *H04L 67/141* (2013.01)

(58) Field of Classification Search
CPC .... H04L 63/20; H04L 67/1097; H04L 67/141
USPC ............ 709/223, 226, 227, 228, 229; 726/1
See application file for complete search history.

(56) References Cited

U.S. PATENT DOCUMENTS

| 7,441,262 | B2* | 10/2008 | Hui ..................... H04L 63/0227 709/229 |
| 10,834,141 | B1* | 11/2020 | Chud ..................... H04L 63/10 |
| 2004/0249974 | A1* | 12/2004 | Alkhatib ............... H04L 69/161 709/245 |
| 2007/0192842 | A1* | 8/2007 | Beaulieu ............... H04L 63/068 726/9 |
| 2015/0058913 | A1* | 2/2015 | Kandasamy ............ H04L 63/20 726/1 |
| 2015/0121076 | A1* | 4/2015 | Wante ................. G06F 21/6245 713/171 |
| 2019/0306116 | A1* | 10/2019 | Paul ..................... H04L 63/0236 |
| 2021/0051178 | A1* | 2/2021 | Kuppannan ............. H04L 63/20 |

* cited by examiner

*Primary Examiner* — Liang Che A Wang
(74) *Attorney, Agent, or Firm* — Anderson Gorecki LLP

(57) ABSTRACT

A consolidated default security policy for a storage node is created by combining a system-wide default security policy with default security policies for multiple protocols and default security policies for multiple applications. The default security policies for protocols and applications include IKE parameters and parameter values. In response to receipt of an IKE request from a peer, the storage node obtains dynamically-assigned source and destination information and finds matching parameters and parameter values in the consolidated default security policy. The matching parameters and parameter values are used with the dynamically-assigned source and destination information to auto-generate a secure channel with the peer.

20 Claims, 3 Drawing Sheets

SECURITY MODULE FOR AUTO-GENERATING SECURE CHANNELS

TECHNICAL FIELD

The subject matter of this disclosure is generally related to data storage systems, and more particularly to establishing secure channels with a converged infrastructure data storage system.

BACKGROUND

Data centers are used to maintain large data sets associated with critical functions for which avoidance of data loss and maintenance of data availability are important. Storage nodes such as SANs (Storage Area Networks) are key building blocks of a data center. SANs provide servers known as "hosts" with block-level access to data that is used by the applications that run on the servers. One type of SAN is a storage array that includes interconnected computing nodes that manage access to arrays of non-volatile storage media such as solid-state drives and disk drives. A single storage array may support multiple clusters of hosts. Each host may support multiple instances of an application, and different hosts may run instances different host.

A converged infrastructure storage system supports multiple applications that use various standard protocols such as Ethernet, Fiber Channel etc. and are treated as a single application instance. IKE (Internet Key Exchange) is used to create SAs (Security Associations) between the storage nodes and the hosts. IKE is an IPsec (Internet Protocol Security) protocol to derive symmetric keys for sending encrypted traffic across channels (links) between local and remote peers. An IKE Security policy defines security parameters and parameter values that are used for establishing SAs. The security parameters may vary for different applications depending on the security hardware the application runs on. Manual configuration of security policies on a per-application peer basis is problematic for a converged infrastructure storage system especially when there are potential large number of host peers connected to the storage systems or with multiple peer replication systems. The term "host peer" may be considered as the host server that is connected to the storage system or remote replication storage systems that are connected to each other for data replication.

SUMMARY

All examples, aspects and features mentioned in this document can be combined in any technically possible way.

In accordance with some implementations a method comprises: responsive to initialization of a storage node: generating a system-wide default security policy; obtaining stored protocol default security policy parameters; obtaining stored application default security policy parameters; generating a consolidated default security policy from the above obtained protocol default security policy parameters, and obtained application default security policy parameters; and responsive to a message from a peer attempting to establish a secure connection with the storage node as a peer: obtaining dynamically-assigned source and destination information; finding protocol default security policy parameters and application default security policy parameters in the consolidated default security policy that match parameters indicated by the message from the peer; and using the system-wide default security policy and matching protocol default security policy parameters and application default security policy parameters of the consolidated default security policy with the dynamically-assigned source and destination information to auto-generate a secure channel with the peer. In some implementations each of the protocol default security policy parameters comprises a plurality of values and the method comprises finding protocol default security policy parameter values in the consolidated default security policy that match parameter values indicated by the message from the peer and using the system-wide default security policy and matching protocol default security policy parameter values of the consolidated default security policy to auto-generate a secure channel with the peer. In some implementations each of the application default security policy parameters comprises a plurality of values and the method comprises finding application default security policy parameter values in the consolidated default security policy that match parameter values indicated by the message from the peer and using the system-wide default security policy and matching application default security policy parameter values of the consolidated default security policy to auto-generate a secure channel with the peer. In some implementations finding protocol default security policy parameters comprises finding a default FC (Fibre Channel) parameters. In some implementations finding protocol default security policy parameters comprises finding a default GIGE (Gigabit Ethernet) parameters. In some implementations finding application default security policy parameters comprises finding a default replication system featured RDR (Remote Data Replication) parameters. In some implementations finding application default security policy parameters comprises finding default host-target applications parameters (such as iSCSI).

In accordance with some implementations an apparatus comprises: a storage node comprising a security module responsive to initialization of the storage node to generate a system-wide default security policy, obtain stored protocol default security policy parameters, obtain stored application default security policy parameters, create a consolidated default security policy from the generated system-wide default security policy, obtained protocol default security policy parameters, and obtained application default security policy parameters, and the security module being responsive to a message from a peer attempting to establish a secure connection with the storage node as a peer to obtain dynamically-assigned source and destination information, find protocol default security policy parameters and application default security policy parameters in the consolidated default security policy that match parameters indicated by the message from the peer and use the system-wide default security policy and matching protocol default security policy parameters and application default security policy parameters of the consolidated default security policy with the dynamically-assigned source and destination information to auto-generate a secure channel with the peer. In some implementations each of the protocol default security policy parameters comprises a plurality of values and the security module finds protocol default security policy parameter values in the consolidated default security policy that match parameter values indicated by the message from the peer and using the system-wide default security policy and matching protocol default security policy parameter values of the consolidated default security policy to auto-generate a secure channel with the peer. In some implementations each of the application default security policy parameters comprises a plurality of values and the security module finds application default security policy parameter values in the consolidated default security policy that match parameter values indicated by the message from the peer and using the system-wide default security policy and matching application default security policy parameter values of the consolidated default security policy to auto-generate a secure channel with the peer. In some implementations the protocol default security policy parameters comprise a default FC (Fibre Channel) parameter. In some implementations the protocol default security policy parameters comprise a default GIGE (Gigabit Ethernet) parameter. In some implementations the default security policy parameters comprise a default RDR (Remote Data Replication) parameter. In some implementations the application default security policy parameters comprise a default host-target application parameters (such as iSCSI).

In accordance with some implementations a computer program embodied on a non-transitory computer-readable medium comprises: logic responsive to initialization of a storage node comprising: instructions that generate a system-wide default security policy; instructions that obtain stored protocol default security policy parameters; instructions that obtain stored application default security policy parameters; instructions that create a consolidated default security policy from the generated system-wide default security policy, obtained protocol default security policy parameters, and obtained application default security policy parameters; and logic responsive to a message from a peer attempting to establish a secure connection with the storage node as a peer comprising: instructions that obtain dynamically-assigned source and destination information; instructions that find protocol default security policy parameters and application default security policy parameters in the consolidated default security policy that match parameters indicated by the message from the peer; and instructions that use the system-wide default security policy and matching protocol default security policy parameters and application default security policy parameters of the consolidated default security policy with the dynamically-assigned source and destination information to auto-generate a secure channel with the peer. In some implementations each of the protocol default security policy parameters comprises a plurality of values and instructions find protocol default security policy parameter values in the consolidated default security policy that match parameter values indicated by the message from the peer and instructions that use the system-wide default security policy and matching protocol default security policy parameter values of the consolidated default security policy to auto-generate a secure channel with the peer. In some implementations each of the application default security policy parameters comprises a plurality of values and instructions find application default security policy parameter values in the consolidated default security policy that match parameter values indicated by the message from the peer and instructions that use the system-wide default security policy and matching application default security policy parameter values of the consolidated default security policy to auto-generate a secure channel with the peer. In some implementations the protocol default security policy parameters comprise default FC (Fibre Channel) parameters. In some implementations the protocol default security policy parameters comprise default a GIGE (Gigabit Ethernet) parameter. In some implementations the application default security policy parameters comprise a default RDR (Remote Data Replication) parameter.

Although specific advantages are not to be viewed as requirements or limitations, some implementations may provide more time-efficient auto-generation of secure channels for converged emulation infrastructure. For example, and without limitation, secure channels between applications across storage systems and hosts may be enabled instantaneously. Another advantage of some implementations is a generically-applicable process for generating and automatically applying a consolidated default security policy. Some implementations may eliminate the necessity to manually configure IKE policy for multiple applications and facilitate policy configuration methodology for the storage systems. Some implementations offer a flexible solution to define a global configuration encryption set parameter for applications and on a per peer basis to disable/enable encryption.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
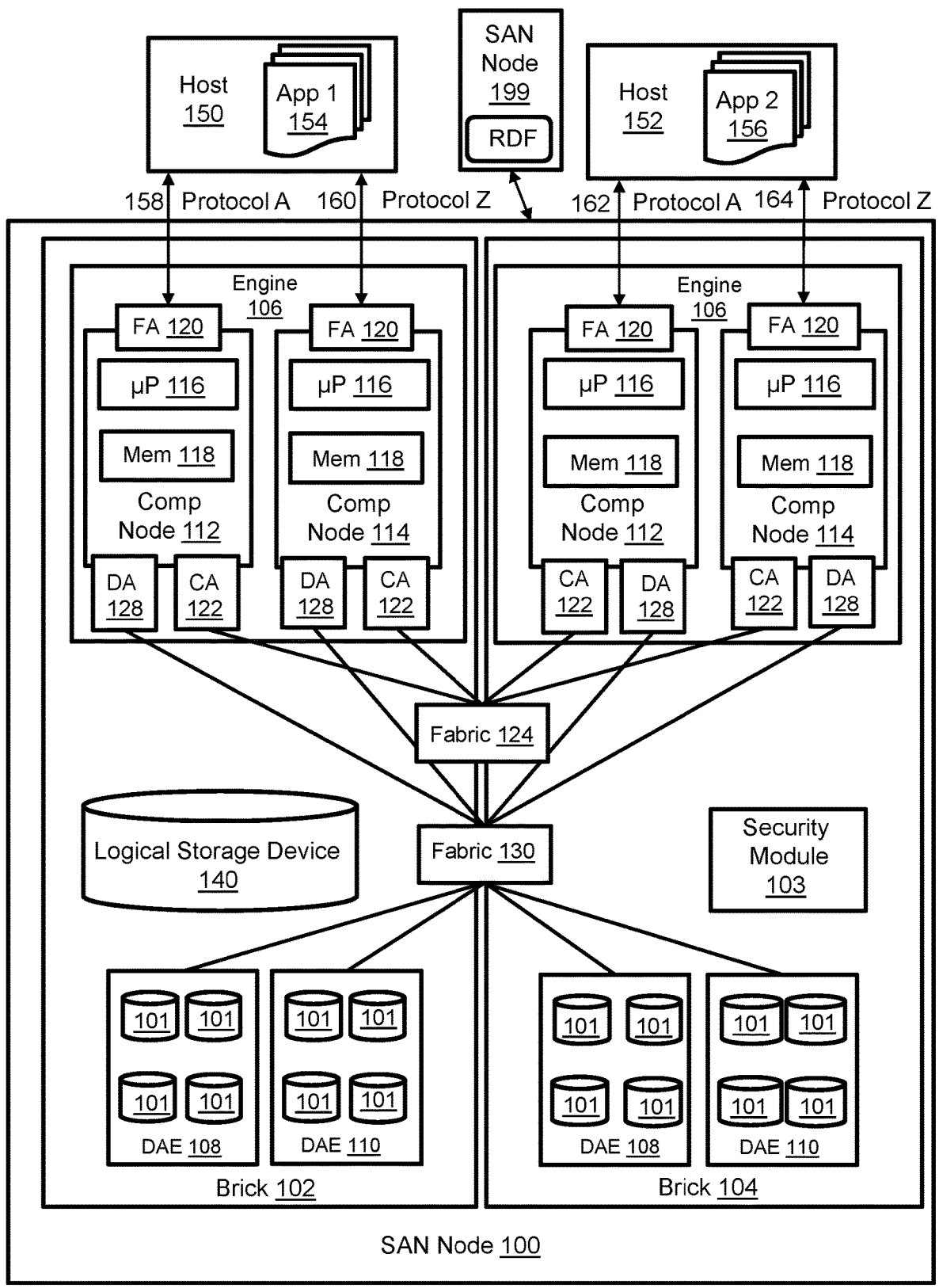
FIG. 1 illustrates a SAN node with a security module that auto-generates secure channels with hosts.

FIG. 1 illustrates a SAN node 100 with a security module 103 that auto-generates secure channels 158, 160, 162, 164 for communicating with hosts 150, 152 and another SAN node 199 with which a replication relationship is maintained. The secure channels may include SAs (Security Associations) based on IKE (Internet Key Exchange). The secure channels include multiple different protocols represented by Protocol A and Protocol Z. Further, the secure channels support the multiple instances of different applications, App 1 154 and App 2 156, running on the hosts and SAN node 199. Auto-generation of the secure channels will be described below.

The SAN node 100, which may be referred to as a storage array, includes one or more bricks 102, 104. Each brick includes an engine 106 and one or more DAEs (Drive Array Enclosures) 108, 110. Each DAE includes managed drives 101 of one or more technology types. Examples may include, without limitation, SSDs (Solid State Drives) such as flash and HDDs (Hard Disk Drives) with spinning disk storage media with some known storage capacity. Each DAE might include 24 or more managed drives, but the figure is simplified for purposes of illustration. Each engine 106 includes a pair of interconnected computing nodes 112, 114, which are sometimes referred to as "storage directors." Each computing node includes at least one multi-core processor 116 and local memory 118. The processor may include CPUs (Central Processing Units), GPUs (Graphics Processing Units), or both, and the number of cores is known. The local memory 125 may include volatile RAM (Random-Access Memory) of any type, NVM (Non-Volatile Memory) such as SCM (Storage Class Memory), or both, and the capacity of each type is known. Each computing node includes one or more FAs (Front-end Adapters) 120 for communicating with the hosts. The FAs have ports and the hosts may access the SAN node via multiple ports in a typical implementation. Each computing node also includes one or more DAs (Drive Adapters) 122 for communicating with the managed drives 101 in the DAEs 108, 110. Each computing node may also include one or more CAs (Channel Adapters) 122 for communicating with other computing nodes via an interconnecting fabric 124. Each computing node may allocate a portion or partition of its respective local memory 118 to a shared memory that can be accessed by other computing nodes, e.g. via DMA (Direct Memory Access) or RDMA (Remote DMA). The paired computing nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN node can access every managed drive 101 in the SAN node. The security module 103 may include program code stored in the memory 118 of the computing nodes and executed by the processors 116 of the computing nodes.

Data associated with the applications is maintained on the managed drives 101, but the managed drives 101 are not discoverable by the hosts 150, 152. The SAN node 100 creates a logical storage device 140 that can be discovered and accessed by the hosts. More particularly, the logical storage device 140 is used by the host applications 154, 156 for storage of host application data. Without limitation, the logical storage device may be referred to as a production volume, production device, or production LUN, where LUN (Logical Unit Number) is a number used to identify the logical storage volume in accordance with the SCSI (Small Computer System Interface) protocol. From the perspective of the hosts 150, 152 the logical storage device 140 is a single drive having a set of contiguous fixed-size LBAs (logical block addresses) on which data used by instances of the host application resides. However, the host application data is stored at non-contiguous addresses on various managed drives 101.

To service IOs from instances of a host application the SAN node 100 maintains metadata that indicates, among various things, mappings between LBAs of the logical storage device 140 and addresses with which extents of host application data can be accessed from the shared memory and managed drives 101. In response to a data access command from an instance of one of the host applications to read data from the production volume 140 the SAN node uses the metadata to find the requested data in the shared memory or managed drives. When the requested data is already present in memory when the command is received it is considered a "cache hit." When the requested data is not in the shared memory when the command is received it is considered a "cache miss." In the event of a cache miss the accessed data is temporarily copied into the shared memory from the managed drives and used to service the TO, i.e. reply to the host application with the data via one of the computing nodes. In the case of an IO to write data to the production volume the SAN node copies the data into the shared memory, marks the corresponding logical storage device location as dirty in the metadata, and creates new metadata that maps the logical storage device address with a location to which the data is eventually written on the managed drives. Read and write "hits" and "misses" occur depending on whether the stale data associated with the IO is present in the shared memory when the IO is received.

SAN node 199 maintains a replica of the logical storage device. Updates to the logical storage device are shared between the SAN nodes. For example, if host 150 sends a write command to SAN node 100 that results in changes to the logical storage device 140 then SAN node 100 communicates the changes to SAN node 199.

In order to establish SAs using IKE, source and destination peers negotiate security arrangements based on various parameters and parameter values. IKE parameter negotiation determines which encryption algorithms are used for encrypting messages, which authentication hash is used for creating a keyed hash from a pre-shared or private key, and which DH (Diffie-Hellman) group is used to generate a secret session key, among other things. Negotiation may begin when a peer attempts to establish a secure connection with the SAN node. For example, a host 150, 152 or SAN node 199 may send a set of cryptographic parameters and a session ID to SAN node 100. The security module 103 compares the parameters and parameter values indicated by the peer with a consolidated set of default parameters and parameter values to identify matches. The security module uses the matching parameters and parameter values for establishing the SA. The two peers (SAN node 100 and the other peer) exchange encryption keys and authenticate the exchange through a pre-shared key or a digital signature. Examples of security parameters (in addition to the encryption and hashing algorithms) include authentication method, group description, group type, group polynomial, key length, and SA lifetime. Each security parameter includes multiple different parameter values. For example, encryption algorithm parameter values may include DES-CBC, IDEA-CBC, Blowfish CBC, and RC5-R16-B64-CBC, for example, while the authentication method parameter values may include pre-shared key, DSS signatures, RSA signatures, and various other IPSEC techniques. Many different combinations are possible because of the number of parameters and parameter values. By matching parameters and parameter values of the consolidated set of default parameters with the parameters and values sent by the peer it is possible to auto-generate a secure channel.

Some SA configuration details may change each time the SAN node is initialized. The security module identifies such configuration details when the SAN node is initialized and adds the configuration details to the consolidated set of default parameters and parameter values. Selected configuration details may be used with the matching security parameters and parameter values to negotiate the SA.

Figure 2:
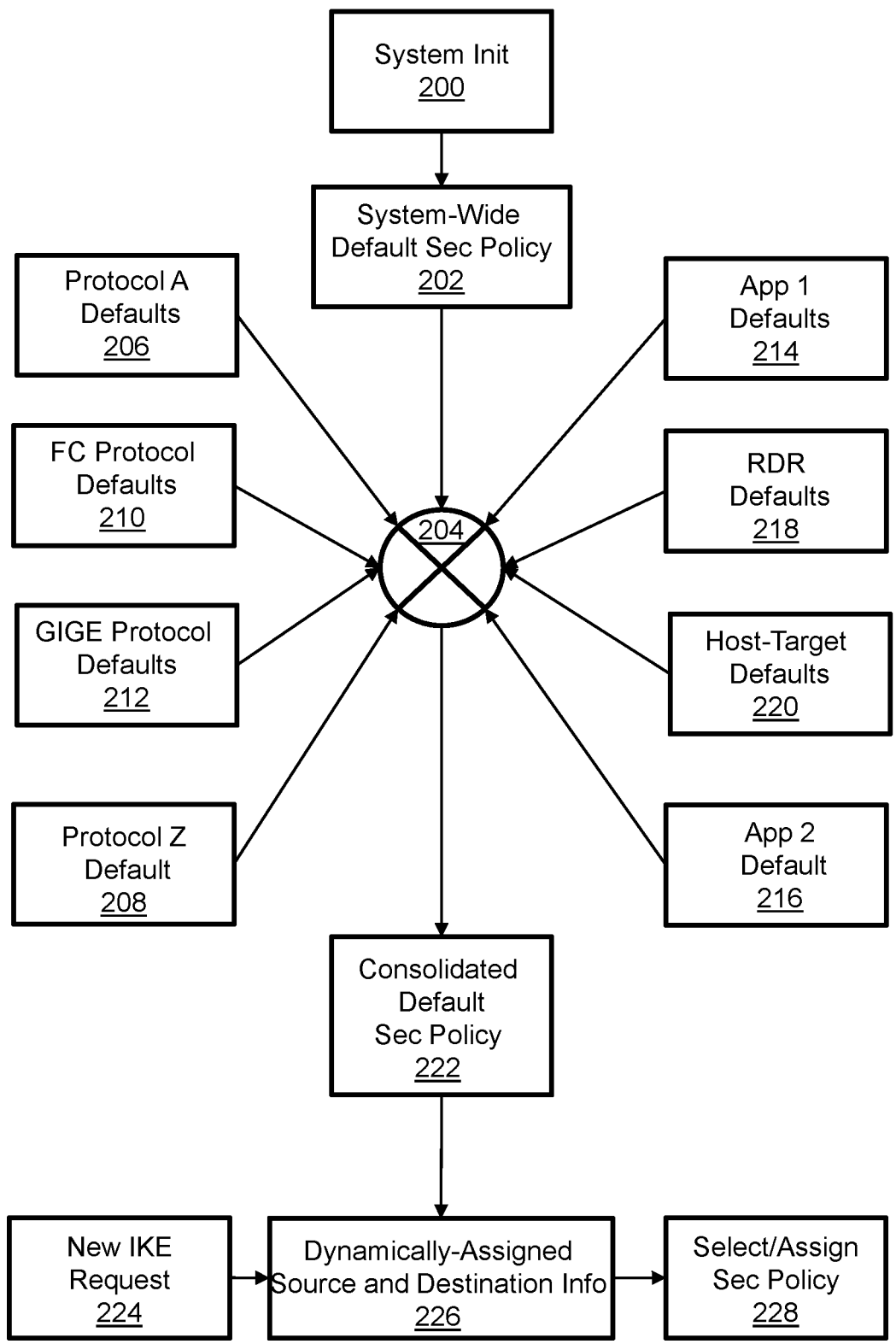
FIG. 2 illustrates operation of the security module.

FIG. 2 illustrates operation of the security module 103 of FIG. 1. Starting with system initialization as indicated in step 200, a system-wide default security policy is generated at step 202. System initialization may include boot of the SAN node. Portions of the system-wide default security policy may be copied from the managed drives into the memory of the computing nodes. Other portions of the system-wide default security policy may be determined based on dynamically assigned or generated configuration details that are subject to change each time the SAN node is initialized. For example, new IP addresses may be assigned at initialization. Also stored in the managed drives are default security policies for supported protocols. In the illustrated examples there is a default security policy 206 for Protocol A, a default security policy 208 for Protocol Z, a default FC (Fibre Channel) security protocol 210, and a default GIGE (Gigabit Ethernet) security protocol 212. Also stored in the managed drives are default security policies for supported applications. In the illustrated examples there is a default security policy 214 for App 1, a default security policy 216 for App 2, a default RDR (Remote Data Replication) security protocol 218 for use with SAN node 199, and Host-Target application security protocol defaults 220 such as iSCSI. The default security policies for supported protocols and default security policies for supported applications may be copied from the managed drives into the memory of the computing nodes. Each default security policy includes at least a basic set of parameters and parameter values for the protocol or application with which it is associated. Different protocols and different applications may require different sets of parameters and parameter values. Moreover, those parameters and parameter values may differ from those of the system-wide default security policy. In step 204 the system-wide default security policy, protocol default security policies 206, 208, 210, 212, and application default security policies 214, 216, 218, 220 are used to generate a consolidated default security policy 222. The consolidated default security policy includes sets of security parameters and parameter values for all supported protocols and applications, in addition to any system default parameters and values and dynamically assigned configuration details. Following receipt of a new IKE request 224, the security module obtains dynamically-assigned source and destination information such as source IP address (GIGE-IPSEC), remote IP address (GIGE-IPSEC), source WWN (FC-EDIF), remote WWN(FC-EDIF), and remote N PORT FCID. The security module uses the dynamically-assigned source and destination information with the consolidated default security policy to select and assign a security policy as indicated in block 228, thereby auto-generating a secure channel. Step 228 may include identifying the protocol and application to be used for the new IKE request 224. Corresponding (e.g. matching) parameters and parameter values are then obtained from the consolidated default security policy 222 and used to negotiate the SA. Because the protocol and application defaults are already known to function with the hosts and the dynamically updated configuration details are obtained from the default security policy, successful SA negotiation is achievable with high confidence.

Figure 3:
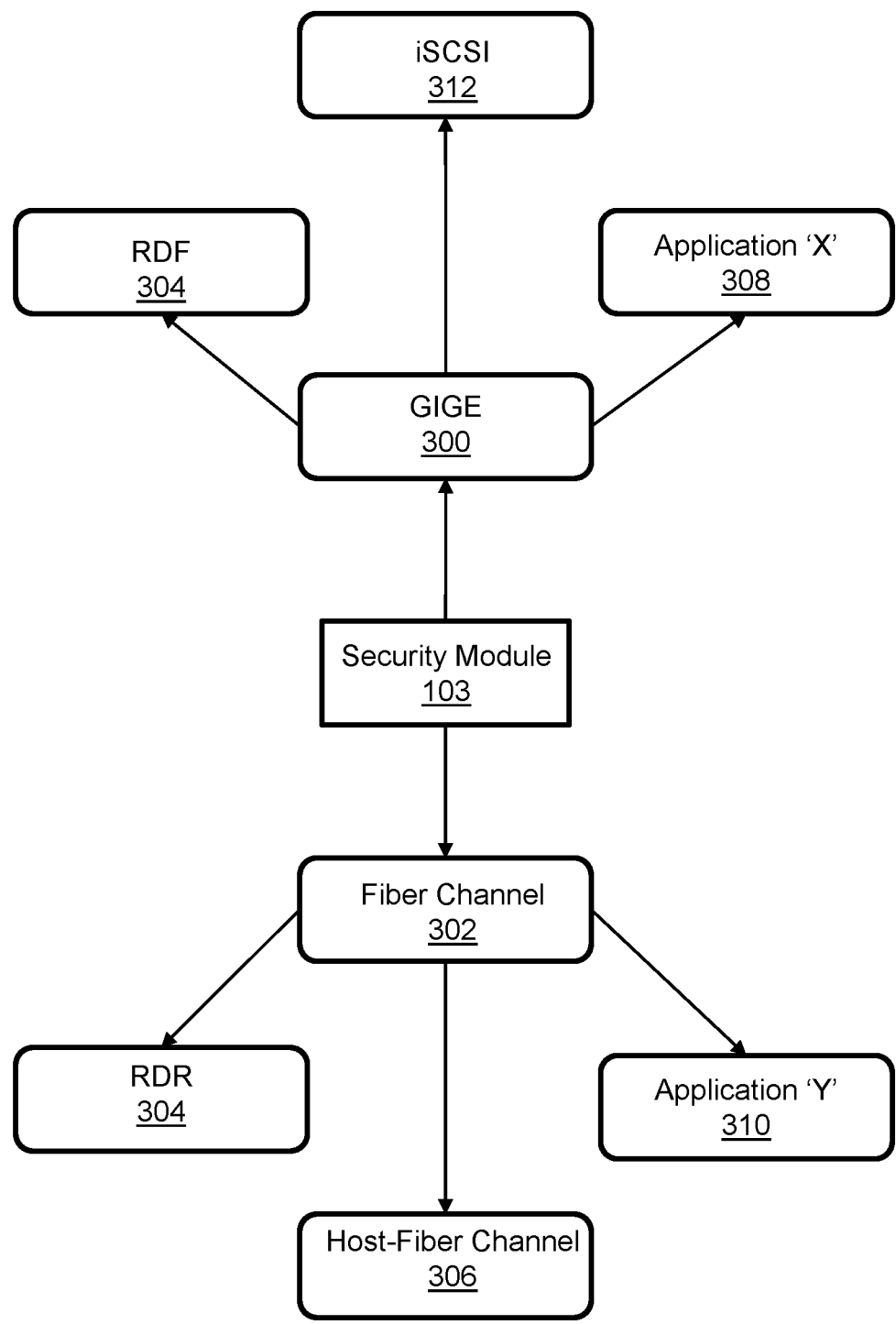
FIG. 3 illustrates generation of a consolidated default security policy.

Referring to FIG. 3, a scalable single default unified secure IPSEC/EDiF policy for a converged emulation infrastructure is automatically generated by the security module 103 to support multiple protocols and applications at the time of system initialization (IML). Users can further configure automatically-generated security policies to meet any other specific requirements such as a different authentication method and IKE proposals, and such manually-configured policies are given priority over the default policy when forming SAs. The consolidated default security policy is the net result of the summation of several defaults considering overall system attributes besides protocols and applications that use the security module to establish the secure channel between local and remote applications. More specifically, the unified policy is generated by overall summation of defaults per protocol, defaults per application, and dynamic assignment of source-destination information.

Regarding the defaults per protocol, storage system applications typically rely on one or more of several industry standard protocols such as Ethernet (e.g. GIGE 300) and Fiber Channel 302, for example, and without limitation. Every protocol is different and IKE security associations for applications that run on each protocol may require protocol-specific parameters such as ID type (IP address for GIGE, WWPN/FC_ID etc.). Data encryption is performed by the hardware embedded in the storage system. Algorithms advertised in the security proposals are dictated by underlying hardware (SLIC) so the methods remain static for the lifetime of the hardware. The security module takes advantage of these aspects and uses the hardware supported methods, enumerating them in the defaults per protocol.

Regarding the defaults per application, storage systems include applications such as front-end applications (e.g. RDR 304 replication module, host-fiber channel connectivity 306, host-target applications such as iSCSI 312, and various other applications such as application X 308 and application Y 310) that mandate secure channels and run encrypted traffic across host and storage systems. The security requirements such as authentication methods, rekeying strategies, security protocol etc. for every application may vary. For instance, a default authentication method is to use pre-shared keys for RDR applications and digital certificates for host-based connections for host-target scalability concerns. The defaults requirements are unlikely to change over time, which can be used to advantage by the security module for generating defaults per application.

Regarding dynamic assignment of source and destination information, new IKE security connection requests include local and peer information that possibly includes, but is not limited to, source IP address (GIGE-IPSEC), remote IP address (GIGE-IPSEC), source WWN (FC-EDIF), remote WWN(FC-EDIF), and remote N_PORT_FCID. The information is dynamically assigned to the security associations at the time of the new IKE negotiation request (unlike traditional approaches). The dynamic assignment of information of parties to SAs eliminates the need to specify the local and remote peer information at the time of configuring the default policy and can be applied dynamically for every combination of local and remote pair at the time of IKE negotiations as initiated by the application Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    responsive to initialization of a storage node:
        generating a system-wide default security policy;
        obtaining stored protocol default security policy parameters;
        obtaining stored application default security policy parameters;
        generating a consolidated default security policy from the generated system-wide default security policy, obtained protocol default security policy parameters, and obtained application default security policy parameters; and
    responsive to a message from a peer attempting to establish a secure connection with the storage node as a peer:
        obtaining dynamically-assigned source and destination information;
        finding protocol default security policy parameters and application default security policy parameters in the consolidated default security policy that match parameters indicated by the message from the peer; and
        using the system-wide default security policy and matching protocol default security policy parameters and application default security policy parameters of the consolidated default security policy with the dynamically-assigned source and destination information to auto-generate a secure channel with the peer.

2. The method of claim 1 wherein each of the protocol default security policy parameters comprises a plurality of values and comprising finding protocol default security policy parameter values in the consolidated default security policy that match parameter values indicated by the message from the peer and using the system-wide default security policy and matching protocol default security policy parameter values of the consolidated default security policy to auto-generate a secure channel with the peer.

3. The method of claim 1 wherein each of the application default security policy parameters comprises a plurality of values and comprising finding application default security policy parameter values in the consolidated default security policy that match parameter values indicated by the message from the peer and using the system-wide default security policy and matching application default security policy parameter values of the consolidated default security policy to auto-generate a secure channel with the peer.

4. The method of claim 1 wherein finding protocol default security policy parameters comprises finding a default FC (Fibre Channel) parameters.

5. The method of claim 1 wherein finding protocol default security policy parameters comprises finding a default GIGE (Gigabit Ethernet) parameters.

6. The method of claim 1 wherein finding application default security policy parameters comprises finding a default RDR (Remote Data Replication) parameters.

7. The method of claim 1 wherein finding application default security policy parameters comprises finding default host-target application parameters.

8. An apparatus comprising:
    a storage node comprising a security module responsive to initialization of the storage node to generate a system-wide default security policy, obtain stored protocol default security policy parameters, obtain stored application default security policy parameters, create a consolidated default security policy from the generated system-wide default security policy, obtained protocol default security policy parameters, and obtained application default security policy parameters, and the security module being responsive to a message from a peer attempting to establish a secure connection with the storage node as a peer to obtain dynamically-assigned source and destination information, find protocol default security policy parameters and application default security policy parameters in the consolidated default security policy that match parameters indicated by the message from the peer and use the system-wide default security policy and matching protocol default security policy parameters and application default security policy parameters of the consolidated default security policy with the dynamically-assigned source and destination information to auto-generate a secure channel with the peer.

9. The apparatus of claim 8 wherein each of the protocol default security policy parameters comprises a plurality of values and the security module finds protocol default security policy parameter values in the consolidated default security policy that match parameter values indicated by the message from the peer and using the system-wide default security policy and matching protocol default security policy parameter values of the consolidated default security policy to auto-generate a secure channel with the peer.

10. The apparatus of claim 8 wherein each of the application default security policy parameters comprises a plurality of values and the security module finds application default security policy parameter values in the consolidated default security policy that match parameter values indicated by the message from the peer and using the system-wide default security policy and matching application default security policy parameter values of the consolidated default security policy to auto-generate a secure channel with the peer.

11. The apparatus of claim 8 wherein the protocol default security policy parameters comprise a default FC (Fibre Channel) parameter.

12. The apparatus of claim 8 wherein the protocol default security policy parameters comprise a default GIGE (Gigabit Ethernet) parameter.

13. The apparatus of claim 8 wherein the default security policy parameters comprise a default RDR (Remote Data Replication) parameter.

14. The apparatus of claim 8 wherein the application default security policy parameters comprise a default host-target application parameter.

15. A computer program embodied on a non-transitory computer-readable medium comprising:
    logic responsive to initialization of a storage node comprising:
        instructions that generate a system-wide default security policy;
        instructions that obtain stored protocol default security policy parameters;
        instructions that obtain stored application default security policy parameters;
        instructions that create a consolidated default security policy from the generated system-wide default security policy, obtained protocol default security policy parameters, and obtained application default security policy parameters; and logic responsive to a message from a peer attempting to establish a secure connection with the storage node as a peer comprising:
  instructions that obtain dynamically-assigned source and destination information;
  instructions that find protocol default security policy parameters and application default security policy parameters in the consolidated default security policy that match parameters indicated by the message from the peer; and
  instructions that use the system-wide default security policy and matching protocol default security policy parameters and application default security policy parameters of the consolidated default security policy with the dynamically-assigned source and destination information to auto-generate a secure channel with the peer.

16. The computer program embodied on the non-transitory computer-readable medium of claim 15 wherein each of the protocol default security policy parameters comprises a plurality of values and comprising instructions that find protocol default security policy parameter values in the consolidated default security policy that match parameter values indicated by the message from the peer and instructions that use the system-wide default security policy and matching protocol default security policy parameter values of the consolidated default security policy to auto-generate a secure channel with the peer.

17. The computer program embodied on the non-transitory computer-readable medium of claim 15 wherein each of the application default security policy parameters comprises a plurality of values and comprising instructions that find application default security policy parameter values in the consolidated default security policy that match parameter values indicated by the message from the peer and instructions that use the system-wide default security policy and matching application default security policy parameter values of the consolidated default security policy to auto-generate a secure channel with the peer.

18. The computer program embodied on the non-transitory computer-readable medium of claim 15 wherein the protocol default security policy parameters comprise default FC (Fibre Channel) parameters.

19. The computer program embodied on the non-transitory computer-readable medium of claim 15 wherein the protocol default security policy parameters comprise default a GIGE (Gigabit Ethernet) parameter.

20. The computer program embodied on the non-transitory computer-readable medium of claim 15 wherein the application default security policy parameters comprise a default RDR (Remote Data Replication) parameter.

\* \* \* \* \*